Thomas A. R. Keech,
Device for Preventing Calves from Sucking.

No. 122,119.  Patented Dec. 26, 1871.

Witnesses.
Alex Mahow
H H Doubleday

Inventor.
Thomas A R Keech
by his Attorney
A. M. Smith

UNITED STATES PATENT OFFICE.

THOMAS A. R. KEECH, OF BLADENSBURG, MARYLAND.

IMPROVEMENT IN CALF-WEANERS.

Specification forming part of Letters Patent No. 122,119, dated December 26, 1871; antedated December 15, 1871.

*To all whom it may concern:*

Be it known that I, THOMAS A. R. KEECH, of Bladensburg, county of Prince George's, State of Maryland, have invented a new and useful Improvement in Device for Preventing Calves from Sucking, of which the following is a full, clear, and exact description, reference being had to the accompanying drawing making part of this specification, in which—

Figure 1:
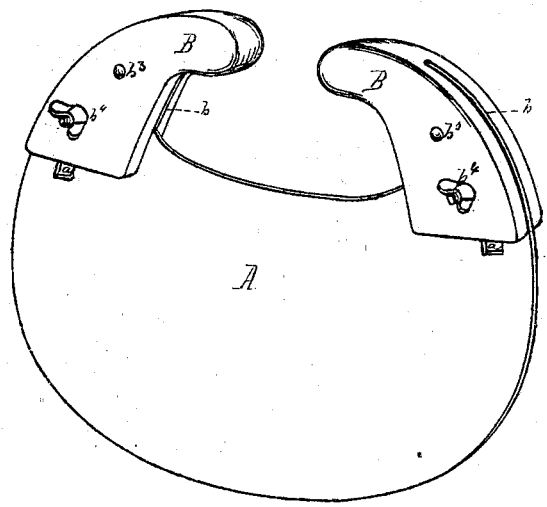
Figure 2:
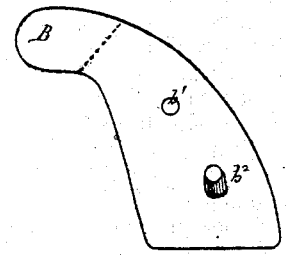
Figure 3:
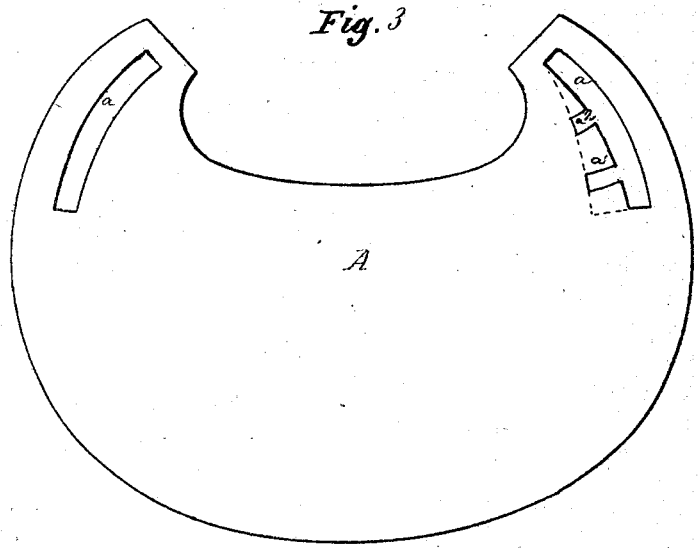

Figure 1 is a perspective view; Fig. 2, a detached view of one of the ears; and Fig. 3 is the plate or lip.

Similar letters of reference denote corresponding parts in both figures.

During the process of weaning calves much difficulty is often experienced in overcoming their natural tendency to suckle the cows, and cows themselves are often addicted to the same habit, in order to break up which various devices have been invented; but they are very imperfect in their operation, and so far fail of producing satisfactory results that farmers are ordinarily obliged to keep their young stock in separate fields, which produces serious inconvenience, not only in sections of the country where fencing is scarce and the land is not suitably subdivided, but upon farms that are divided into small fields, because it is often difficult to furnish them with a proper supply of water when thus detached from the rest of the herd.

My invention relates to an improvement upon the patent of A. S. Haven, February 4, 1868; and consists in a cheap and convenient construction and arrangement of the devices by which the lip or flap, to be hereinafter described, can be suspended from the nose of the animal in such manner as to hang therefrom, as will be hereinafter fully described.

In the drawing, A represents a plate, made preferably of metal and in crescent form, as shown in Fig. 3. Each end or horn is provided with a circular slot, $a$, for a purpose which will be explained. B B are ears or jaws made in substantially the shape shown, so as to form continuations of the horns. These ears are slotted, as at $b$, Fig. 1, so that they will slip over and fit closely the plate or flap A. The ears are perforated, as at $b^1$ $b^2$, Fig. 2. A rivet, $b^3$, passes through perforations $b^1$, as in Fig. 1, and a thumb-screw, $b^4$, passes through perforations $b^2$. Both the rivet and screw pass through the slots in the plate A, thus securing the ears to the plate, as will be readily understood.

The device is applied to the animal by placing one of the ears B upon each side of the cartilaginous septum or division of the nose, the ears serving as a clamp by which the plate is suspended in such manner that, although it does not interfere with eating or drinking when the nose is down upon the ground, because it swings at some distance from the under jaw, yet it effectually prevents suckling, from the fact that when the head is in a horizontal position it (the plate) hangs down directly in front of the animal's mouth.

When preferred, the slots $a$ may be expanded into notches, as at $a'$, Fig. 3, and either the rivet $b^3$ or screw $b^4$ may be made to enter one of these notches for the purpose of changing the angle of relation between the ears and the plate; or the inner side of the slot may be made in the form shown in dotted lines, to accomplish the same purpose.

It will be apparent that the clasp may be fitted to animals of different ages and sizes, as the ears can be adjusted to accommodate any thickness of septum in the nose; but I do not wish to be limited to the use of adjustable ears, for I have found that the device can be made in one piece, as the elasticity of the cartilage will permit of its application to the nose with but little difficulty.

As a modification of the above-described construction, it may be found desirable to make the device, wholly or in part, of vulcanized rubber, in which case a very convenient construction could be made by forming the upper ends of ears B into bulbs or knobs and connecting them to the plate A by means of flexible shanks or stems.

My device is, of course, adapted to be applied to young colts as well as cows or calves.

I do not claim, broadly, the combination of adjustable tips or lugs with the flap or plate A, as they are admitted to be old.

Having now described my invention, what I claim as new, and desire to secure by Letters Patent, is—

In combination with the slotted plate or flap A, the slotted adjustable ears B and thumb-screws $b^4$, constructed and operating as set forth.

In testimony whereof I have hereunto set my hand this 17th day of May, A. D. 1871.

THOMAS A. R. KEECH.

Witnesses:
EDM. F. BROWN,
ALEXR. MAHON.

(144)